Patented Apr. 28, 1953

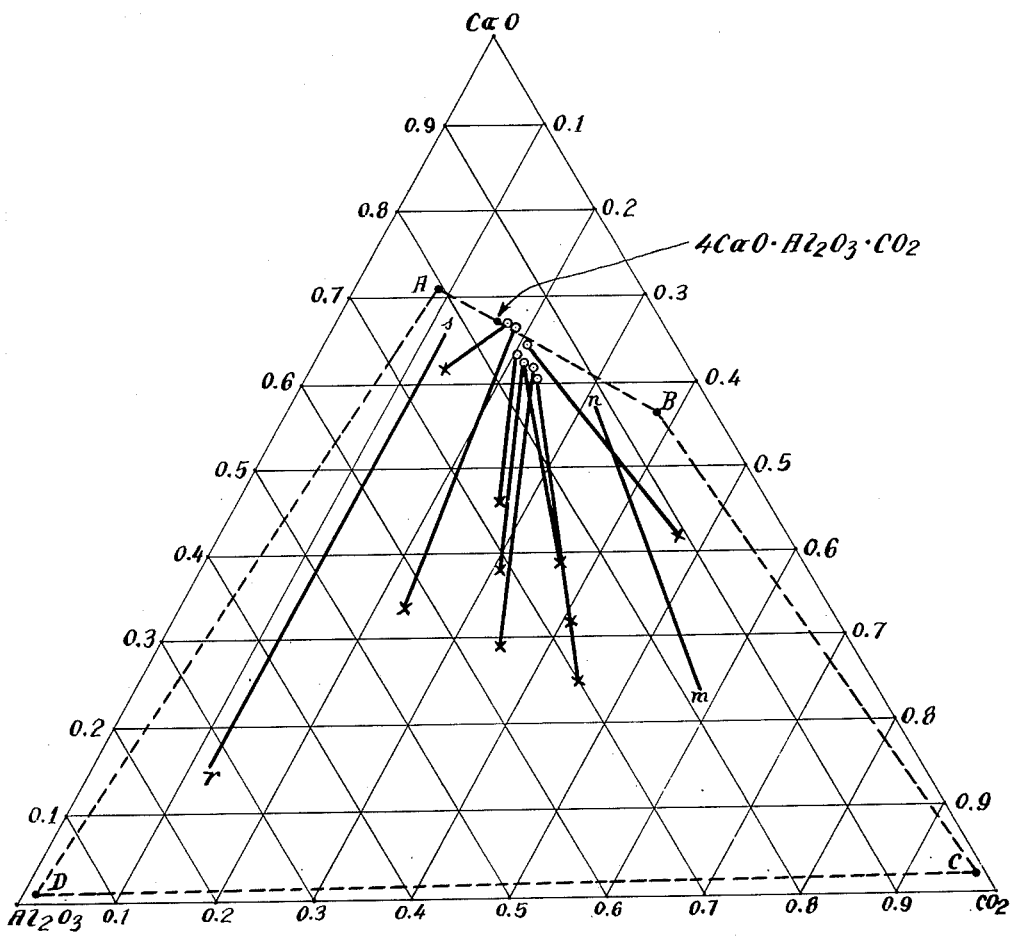
INVENTOR.
James R. Wall

2,636,830

UNITED STATES PATENT OFFICE 2,636,830

CALCIUM ALUMINATE-CARBONATE PRODUCT AND METHOD OF MAKING THE SAME

James R. Wall, Collinsville, Ill., assignor to Aluminum Company of America, Pittsburgh, Pa., a corporation of Pennsylvania Application November 10, 1949, Serial No. 126,504

6 Claims. (Cl. 106—306)

This invention relates to the production of a new product composed entirely, or in substantial part, of a new compound and possessing a combination of properties which recommend said product for various useful purposes. The invention further relates to methods by which this product may be produced in desirable form.

In the following description of this invention, and in the claims, reference will be made to the appended drawing, in which the attached figure is a plot, on triangular coordinates, of data useful to the explanation and definition of the product of this invention and of the methods of producing said product in desirable form.

I have discovered that when lime, alkali metal aluminate and soluble carbonate are mixed together with water to form a slurry, and the slurry is digested, an insoluble reaction product is formed which is usually of relatively constant composition. By way of illustration of this phenomenon reference is had to the figure where certain molar ratios of $Al_2O_3$, $CaO$ and $CO_2$ are represented by triangular coordinates. Plotted on this figure and designated by the symbol X are compositions of various slurries of the type above described, the expression of these compositions being, of course, in terms of the molar ratios of $CaO$, $Al_2O_3$ and $CO_2$ therein. Likewise plotted on the figure and designated by small circles (o) are the compositions resulting from the digestion of the designated slurries. Solid lead lines connect each reaction slurry (x) with its reaction product (o). In the instances thus illustrated the reaction products tend to achieve a constant composition in which the $Al_2O_3$ and $CO_2$ are in equal molar ratio. When samples of these reaction products are exposed for 24 hours to monochromatic radiation (using a zirconium oxide filter) from an X-ray tube of a multiple diffraction apparatus, there is revealed a diffraction pattern which is typical of a compound but is not identifiable with any of the recognized standard patterns available for known elements and compounds, including, of course, calcium carbonate and the various calcium aluminates. Calculations based on the actual chemical content of reaction products such as those identified by the circles of the figure reveal but two probabilities as to the nature of the product, either that it is composed of a mixture of $3CaO.Al_2O_3$ and $CaCO_3$ or that it is a product of formula $4CaO.Al_2O_3.CO_2$, which of course could be alternatively written as $3CaO.Al_2O_3.CaCO_3$. However, the X-ray diffraction patterns of $3CaO.Al_2O_3$ and of $CaCO_3$ are known and, since such patterns do not appear to any substantial extent when the reaction products of the type illustrated in the figure by the small circles are examined, the evidence is positive to the effect that the product is $4CaO.Al_2O_3.CO_2$. That a new compound is formed is shown by the occurrence of a diffraction pattern not identifiable with patterns of possible known compounds which could be produced by the reactants. When these reaction products are thoroughly dried at 110° C., the product contains 8 molecules of water. This new compound may be written as $$4CaO.Al_2O_3.CO_2 8H_2O$$

which is the formulation hereinafter used herein and in the appended claims to designate the compound having the distinctive X-ray diffraction pattern of the distinctive features set forth in Table I. As will be apparent from the following paragraphs, the present invention is directed to a new product containing at least 50% of this new compound and having a particular form.

Experience has shown that the distinctive features of a diffraction X-ray pattern are best shown by tabulating in comparative form the spacings of the distinctive lines of the pattern and the relative intensities of such lines. Such a tabulation of a typical pattern of the new compound of this invention is set forth in Table I.

Table I

| Spacings of distinctive lines, Angstroms | Relative intensities of the line |
|---|---|
| 7.40 | Very strong. |
| 4.79 | Very weak —. |
| 3.76 | Strong. |
| 3.27 | Very weak —. |
| 3.03 | Weak. |
| 2.84 | Weak +. |
| 2.72 | Very weak. |
| 2.49 | Weak. |
| 2.41 | Weak —. |
| 2.33 | Do. |
| 2.10 | Very weak. |
| 2.01 | Very weak —. |
| 1.93 | Very weak. |
| 1.86 | Very weak —. |
| 1.82 | Very weak +. |
| 1.65 | Medium +. |
| 1.51 | Very weak —. |
| 1.44 | Do. |
| 1.08 | Very weak. |

*Methods of making the product of this invention*

While it appears that a low temperature digestion of an aqueous slurry containing $CaO$, alkali metal aluminate and soluble carbonate will always produce a quantity of compound identifiable as having the X-ray diffraction pattern of the type shown in Table I, it does not thereby follow that the reaction product of such slurries will have the form, composition or properties of the product of this invention, i. e., will possess the form and composition having the properties and uses hereinafter described.

In order to obtain a product containing this new compound in desired form and with the desired properties, I have discovered that the reaction should proceed according to the following principles:

(a) The aqueous reaction slurry should contain the molar proportions of CaO, soluble $Al_2O_3$ and available $CO_2$ lying within the area defined on the figure as being bounded by the broken line A, B, C, D. If such molar proportions are not used, the presence in the reaction product of free lime, $3CaO.Al_2O_3$ or $CaCO_3$ may be such as to blanket the beneficial properties imparted to the product by the presence of the new compound.

(b) The CaO should be added to the reaction slurry as milk of lime and not as dry hydrated lime or quicklime. When dry hydrated lime, or quicklime, is used as the reactant, the new compound is formed but the reaction product is relatively coarse, gritty and dense.

(c) The temperature of the slurry during digestion should not exceed 125° C. and preferably should not exceed 85° C. The best yield of the compound above identified as

$4CaO.Al_2O_3.CO_2.8H_2O$ is obtained at about room temperature, 15° to 30° C., and likewise the reaction product has the best properties when digestion is at such temperatures. As digestion temperature is increased, particularly above 60° C., less of the new compound is formed. In any event, slurry temperatures over about 125° C. produce a reaction product tending to coarseness and high density.

When the above principles are followed, the reaction product is a light, bulky, fine-particled mass containing at least 50% of the new compound identifiable by X-ray diffraction patterns illustrated in Table I.

It will be understood that the product sought to be produced and producible by these methods is not necessarily a product corresponding exactly, when dried at 110° C., to the formulation $4CaO.Al_2O_3.CO_2.8H_2O$. Within the range of reaction slurries comprehended by the area of the figure which is bounded by the broken line A, B, C, D, are reaction slurry compositions containing such amounts of CaO, soluble $Al_2O_3$ and reactive $CO_2$ that either the $Al_2O_3$ or the $CO_2$ is in excess over that required by the molar ratio of 1 to 1 in which these reactants appear in the compound $4CaO.Al_2O_3.CO_2$. In such case at least some of the $Al_2O_3$ in excess over this ratio will appear as $3CaO.Al_2O_3.6H_2O$ in the final dried product while at least some of the $CO_2$ in excess over this ratio will appear as $CaCO_3$. While a minimum of either of these compounds is to be desired in the final reaction product, the presence of one or the other or both is within the concept of this invention so long as the new compound identifiable as the described X-ray diffraction pattern is present in amounts of at least 50 per cent by weight. In commercial practice the product will also contain impurities such as metallic oxides which reflect the impurities in the starting reactants which are precipitated as insolubles during the reaction. These impurities are principally those present in limestone used to prepare the lime. They are usually, therefore, magnesia, silica and some iron and commonly do not exceed 5 per cent by weight of the final product. I have observed that the compound $CaCO_3$ will always appear in the reaction product even when there is added to the reaction slurry insufficient soluble carbonate to satisfy the molar ratio of $Al_2O_3$ to $CO_2$ in the formula $4CaO.Al_2O_3.CO_2$. This is because of the practical impossibility of obtaining a milk of lime free of the insoluble $CaCO_3$.

In the preferred practice of the method above described the reaction slurry is so formed that soluble $Al_2O_3$ and reactive $CO_2$ are in excess over that theoretically required for complete reaction with the milk of lime to satisfy the formula $4CaO.Al_2O_3.CO_2$. Under such conditions the reaction product will be composed, for the most part, of the new compound above described.

For best results the reaction slurry should be agitated for a relatively long time, such as several hours, before removal of the reaction product therefrom. The condition of the reactants and the relatively low temperature of the slurry appear to cause slow reaction conditions. Thus it has been observed that reaction mixtures such as $r$ and $m$ (see the figure) will often produce the respective reaction products $s$ and $n$ although, if the reaction was entirely complete the reaction product $s$ should be to the right of its indicated position and the reaction product $n$ should be to the left of its indicated position. This is apparently the result of insufficient reaction time although the product thus produced will be within the composition limits above set forth. The soluble carbonate which is added to the reaction slurry to produce available reactive $CO_2$ in that slurry may be introduced through the medium of any alkali metal carbonate, ammonium carbonate or $CO_2$ the only test being solubility of the carbonate. The soluble carbonate compounds, however, are preferred over the use of $CO_2$ chiefly because of their greater efficiency in the reaction slurry.

*The product of this invention, its physical forms, properties and uses*

When the methods above described are followed, there is produced a product containing at least 50 per cent of a new compound having the described X-ray diffraction pattern and being composed of CaO, $Al_2O_3$ and $CO_2$ in the molar amounts expressed by the formula

$4CaO.Al_2O_3.CO_2$ the balance of the product being composed of at least one compound of the group consisting of $3CaO.Al_2O_3$ and $CaCO_3$, some impurities, water of hydration corresponding to about 8 molecules per mole of the said new compound present and 6 molecules per mole of the $3CaO.Al_2O_3$ present. This product is bulky in form, having an apparent density of not more than 30, and in its preferred form not more than 20, pounds per cubic foot. In color the product is usually light cream to white. It is also characterized by a relatively smooth texture and a small particle size characterized by the fact that a majority of its particles are less than 2 to 3 microns in maximum dimension, and in preferred forms less than 1 micron in maximum dimension.

The new product of this invention has several uses. In the rubber industry it is useful as an activator for rubber vulcanization and also as a reinforcing filler. In this latter capacity it imparts high tensile strength, modulus, tear resistance and abrasion resistance to the rubber. It is useful as a paper filler and, when used as a pigment for coating paper, it imparts a high degree of brightness, gloss and opacity. It is likewise useful as a pigment for casein paints and as an anti-settling agent in oil base paints. The new product of the invention has good heat insulation properties and is useful as an insulating material when low or medium temperatures are to be controlled.

Specific examples of the practice of the methods of this invention to obtain the product herein described and claimed are:

A. Seven and a half liters of milk of lime containing 1515 grams of $Ca(OH)_2$ were added to about 30 liters of an aqueous sodium-aluminate-sodium carbonate solution containing 23.5 grams per liter of $Al_2O_3$, 59.2 grams per liter of NaOH and 29.2 grams per liter of $Na_2CO_3$. For 18 hours this mixture was maintained at a temperature of about 75° F. while stirring. The resultant slurry was settled, the supernatant liquid siphoned off and the reaction product washed several times with water by usual stirring, settling and decanting procedures. Thereafter the product was filtered, given an additional wash and then dried at 220° F. The resultant filter cake was then separated into its constituent particles. These particles were found to be on an average of less than 2 microns in maximum dimension. The product, which contained about 91 per cent by weight of the new compound referred to previously ($4CaO.Al_2O_3.CO_2.8H_2O$), had the following analysis: $Al_2O_3$—18 per cent by weight; CaO—42.4 per cent by weight; $CO_2$—9 per cent by weight, and $H_2O$—29.1 per cent by weight.

B. Seven hundred eighty milliliters of milk of lime containing 148 grams of $Ca(OH)_2$ were added to 4.34 liters of an aqueous sodium aluminate-sodium carbonate solution containing 23.5 g./l. $Al_2O_3$, 27.7 g./l. NaOH and 24.4 g./l. $Na_2CO_3$. This mixture was stirred for a period of 20 hours at about 80° F. The product was filtered, repulped twice in 2.5 liters of water with filtration after each repulp and finally washed with one-half liter of water on the filter. The product was then dried in an oven at 230° F. The dried product weighed 271 grams. It contained about 90 per cent by weight of the new compound. The chemical analysis of the product was as follows:

| | Per cent |
|---|---|
| $Al_2O_3$ | 17.85 |
| CaO | 40.35 |
| $CO_2$ | 10.10 |
| $Fe_2O_3$ | .15 |
| $Na_2O$ | .20 |
| MgO | 1.26 |
| $H_2O$ | 30.30 |

C. Seven hundred milliliters of milk of lime containing 173.7 grams of $Ca(OH)_2$ were added to 3.40 liters of an aqueous sodium aluminate-sodium carbonate solution which contained 23.5 g./l. $Al_2O_3$ 27.5 g./l. NaOH and 13.6 g./l. $Na_2CO_3$. The mixture was stirred for 23 hours at about 80° F. The product was filtered and slurried in 2 liters of water four successive times with filtration after each. The washed product was dried at 230° F. The dry weight was 310 grams, of which about 84 per cent by weight was the new compound, $4CaO.Al_2O_3.CO_2.8H_2O$. The chemical analysis of the product was as follows:

| | Per cent |
|---|---|
| $Al_2O_3$ | 19.33 |
| CaO | 40.00 |
| $CO_2$ | 7.20 |
| $Fe_2O_3$ | .17 |
| $Na_2O$ | Nil |
| MgO | .18 |
| $H_2O$ | 32.1 |

D. Seven hundred eighty milliliters of milk of lime containing 148 grams of $Ca(OH)_2$ were added to 1.73 liters of sodium aluminate-sodium carbonate solution containing 23.5 g./l. $Al_2O_3$, 27.7 g./l. NaOH and 97.8 g./l. $Na_2CO_3$. The mixture was stirred for 22 hours at bout 80° F. The product was filled, slurried in 2 liters of water, filtered, again slurried in 2 liters of water and filtered. After the last filtration the cake was washed with one-half liter of water on the filter. The filter cake was then dried at 230° F. The dried product weighed 247 grams, of which which about 60 per cent by weight was the compound $$4CaO.Al_2O_3.CO_2.8H_2O$$

The chemical analysis of the product was as follows:

| | Per cent |
|---|---|
| $Al_2O_3$ | 11.92 |
| CaO | 44.85 |
| $CO_2$ | 20.67 |
| $Fe_2O_3$ | .19 |
| $Na_2O$ | 1.18 |
| MgO | 1.34 |
| $H_2O$ | 20.91 |

The density values referred to herein, and in the appended claims, refer to densities determined by the vacuum method. In this method a selected amount of material is introduced into a tube, such as a Nessler tube, which has been carefully calibrated to determine the relation between depth and volume therein. The tube is closed and evacuated to a vacuum of 28 inches of mercury. The tube is then firmly tapped on its bottom until the material therein is compacted and shows no decrease in height on further tapping. The minimum volume thus obtained is measured and the relation between this volume and the weight of the material in the tube taken as the apparent density.

This application is a continuation-in-part of my copending application Serial No. 472,494 filed January 13, 1943, now abandoned.

Having thus described my invention, I claim:

1. The new compound $4CaO.Al_2O_3.CO_2$ in light, bulky, fine-particled precipitated mass characterized by an apparent density of less than 30 pounds per cubic foot and by particles the majority of which are of the order of 2 or 3 microns or less in maximum dimensions.

2. Composition of matter containing at least 50 per cent by weight of the compound $$4CaO.Al_2O_3.CO_2$$

the balance being composed of at least one compound of the group consisting of $3CaO.Al_2O_3$ and $CaCO_3$, impurities and water of hydration, said composition being a light, bulky, fine-particled precipitated mass characterized by an apparent density of less than 30 pounds per cubic foot.

3. The method of making a product containing at least 50 per cent by weight of the compound $4CaO.Al_2O_3.CO_2$ which comprises forming an aqueous slurry containing milk of lime, soluble $Al_2O_3$ and reactive $CO_2$ in any molar proportion represented by a point lying within that area of the diagram of the attached drawing which is bounded within the line A,B,C,D, heating said slurry at temperatures not greater than about 125° C. and separating the reaction product from the slurry.

4. As a new product a compound having molar proportions represented by the formula $$4CaO \cdot Al_2O_3 \cdot CO_2$$

and yielding a diffraction X-ray pattern the distinctive lines of which are spaced as follows and have the following relative intensities:

| Spacings of distinctive lines, Angstroms | Relative intensities of the line |
|---|---|
| 7.40 | Very strong. |
| 4.79 | Very weak −. |
| 3.76 | Strong. |
| 3.27 | Very weak −. |
| 3.03 | Weak. |
| 2.84 | Weak +. |
| 2.72 | Very weak. |
| 2.49 | Weak. |
| 2.41 | Weak −. |
| 2.33 | Do. |
| 2.10 | Very weak. |
| 2.01 | Very weak −. |
| 1.93 | Very weak. |
| 1.86 | Very weak −. |
| 1.82 | Very weak +. |
| 1.65 | Medium +. |
| 1.51 | Very weak −. |
| 1.44 | Do. |
| 1.08 | Very weak. |

5. The method of making a product containing at least 50 per cent by weight of the compound $4CaO \cdot Al_2O_3 \cdot CO_2$ which comprises forming an aqueous slurry containing milk of lime, soluble $Al_2O_3$ and reactive $CO_2$ in any molar proportion represented by a point lying within that area of the diagram of the attached drawing which is bounded within the line A, B, C, D, heating said slurry at temperatures not greater than about 125° C. and separating the reaction product from the slurry and drying said product by heating the same to remove uncombined water.

6. Composition of matter containing at least 50 per cent by weight of the compound $4CaO \cdot Al_2O_3 \cdot CO_2$, the balance consisting essentially of at least one compound of the group consisting of $3CaO \cdot Al_2O_3$ and $CaCO_3$, being the dried precipitate of an aqueous slurry of milk of lime, alkali metal aluminate and soluble carbonate, and said composition being characterized by an apparent density of less than 30 pounds per cubic foot and by the further fact that the majority of the particles are of the order of 2 to 3 microns or less in maximum dimensions.

JAMES R. WALL.

References Cited in the file of this patent

UNITED STATES PATENTS

| Number | Name | Date |
|---|---|---|
| 1,620,332 | Evans | Mar. 8, 1927 |

FOREIGN PATENTS

| Number | Country | Date |
|---|---|---|
| 428,584 | Great Britain | May 15, 1935 |
| 441,161 | Canada | May 6, 1947 |

OTHER REFERENCES

"Comprehensive Treatise on Inorganic and Theoretical Chemistry," Mellor, vol. 5, 1924, pages 290, 291 and 359.